April 4, 1961  B. REYNOLDS  2,977,942
METHOD OF OPERATING AN INTERNAL COMBUSTION ENGINE
Filed July 2, 1958
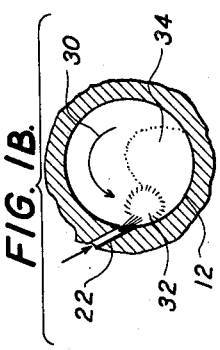
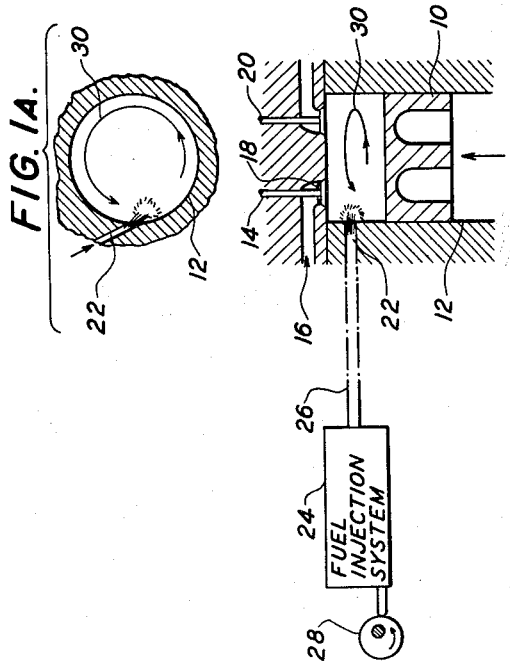
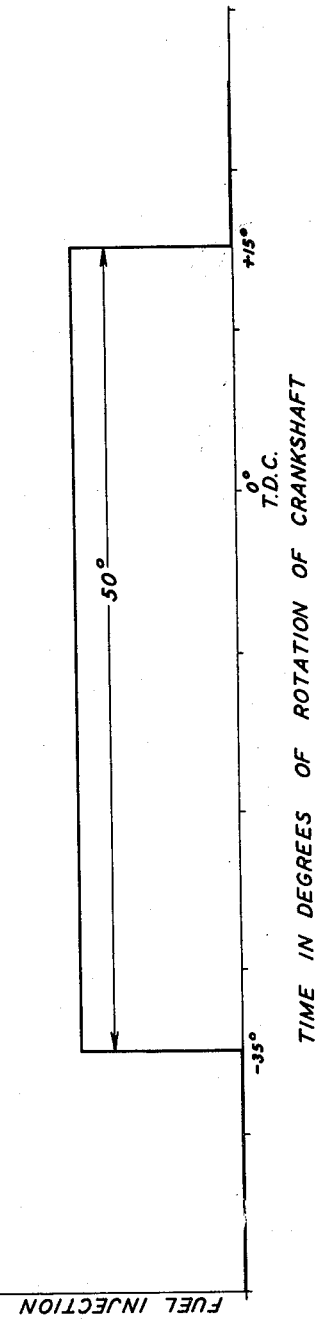
INVENTOR.
BLAKE REYNOLDS
BY
ATTORNEY

United States Patent Office 2,977,942
Patented Apr. 4, 1961

2,977,942

METHOD OF OPERATING AN INTERNAL COMBUSTION ENGINE

Blake Reynolds, Riverside, Conn., assignor to Texaco Development Corporation, New York, N.Y., a corporation of Delaware Filed July 2, 1958, Ser. No. 746,579

3 Claims. (Cl. 123—32)

This invention relates generally to a reciprocating piston, internal combustion engine and to its method of operation, and more particularly, is concerned with an engine operating with compression ignition and flame front combustion.

This application is a continuation-in-part of my copending application for patent, Serial No. 307,226, filed August 30, 1952, now abandoned.

In present day "diesel" engines, which operate on the practical approximation of the classic thermodynamic diesel cycle, fluid fuel is injected into the cylinder in one short burst, with all of the fuel for each cycle being introduced rapidly in about 20 crank angle degrees. The fuel thus introduced is mixed with air in the cylinder to form a combustible mixture, which is compressed while being formed, and compression ignition occurs when the mixture attains the pressure and temperature for the period of time required to cause it to ignite. Compression ignition starts after a time interval following the beginning of fuel injection, which period is termed ignition lag, and generally before the end of fuel injection.

It has been proposed heretofore to cause the air in some "diesel" engine cylinders to swirl, preferably turbulently, so as to result in more complete combustion of the fuel. In such cases, the fuel is injected rapidly so that a small portion of the air is impregnated at a rich fuel-air weight ratio, and the turbulence of the air serves to bring additional air into contact with the flaming fuel particles during the final period of the combustion phase. However, the time involved in each cycle is not sufficient to complete the combustion of fuel in this manner when sufficient fuel is injected for operation at maximum power, so that the exhaust is smoky due to the incomplete combustion. Consequently, the maximum power of such engines must be limited in order to avoid smoky exhaust.

I have discovered that present day "diesel," i.e. compression ignition, engine operation can be greatly improved and that more fuel can be burned and more power developed in such an engine without producing a dirty, i.e. smoky, exhaust by causing the oxidizing gas, e.g. air, to swirl around the engine cylinder in an orderly fashion at a substantially fixed rate with respect to the engine speed and by injecting the fuel into the swirling oxidizing gas in the cylinder in a controlled manner and at a rate which is correlated with the velocity and density of the swirling gas, to form a localized combustible mixture which is ignited and burned so that substantially all of the combustion of fuel occurs within a localized area in the cylinder. The oxidizing gas is caused to swirl around the cylinder at a controlled rate with respect to the engine speed, the swirl rate being four to nine times the speed of the engine in r.p.m. Fuel is injected during the major portion of one air swirl, e.g. during 50 crank angle degrees if the swirl rate of the air is six so that each swirl takes 60 degrees of crank angle. Thus the duration of fuel injection is longer than that for an ordinary "diesel" engine for the same load.

Fuel injection is started during the compression stroke and the first increment of fuel-air mixture is ignited by compression as soon as possible after it is formed. For this purpose, the engine has a compression ratio of at least 14:1, and may reach 17:1, and the fuel, for at least the initial part of the injection on each cycle, has a cetane number of at least about 40, whereby compression ignition of the first increment of injected fuel occurs very promptly and before sufficient fuel has accumulated in the combustion space to result in an objectionable high intensity knock or thump following compression ignition of this first localized batch. As the cetane number of the fuel improves, i.e. increases, with the same compression ratio, the ignition lag decreases so that the amount of injected fuel, which is to be ignited by compression, is reduced and upon its ignition, the intensity of the resulting knock is not so great. Conversely, if the original ignition lag is to be maintained, the compression ratio of the engine may be reduced.

Due to the swirling air and the continued fuel injection, the flaming particles of fuel, which have been ignited by compression, unite to form a flame front generally along a radius of the combustion space and substantially less than 90°, such as about 30°–60°, of angular swirling movement from the locus of fuel injection. During the remainder of the combustion phase, successive increments of fuel and oxidizing gas are formed into patches of combustible mixture, immediately in advance of the formed flame front and the resulting patches of combustible mixture are burned at the flame front substantially as soon as they are formed, so that a patch of combustible mixture is progressively formed and consumed in a localized area of the cylinder.

Thus during the latter part of the combustion phase of each cycle, the injected fuel is formed into a patch of combustible mixture which is confined in one direction by the swirling stream of oxidizing gas traveling toward the patch and containing little or no vaporized fuel, so that it is incombustible. The patch is confined on the other side by gaseous products of combustion traveling away from the flame front at the edge of the patch where the mixture is burned substantially as fast as it is formed. Thus, combustion is confined to and completed at the leading edge of the patch during the latter part of the combustion phase.

Fuel combustion in such an engine is more efficient than in present day conventional "diesel" engines, and knock intensity and exhaust smoke are greatly reduced.

The invention is explained with reference to the drawings, in which:

Figs. 1A and 1B illustrate the operation of an engine in accordance with my method; and Fig. 2 is a diagram illustrating one possible fuel timing arrangement for achieving the engine operation shown in Figs. 1A and 1B, the time scale of the diagram being correlated with the timing of the combustion process shown in Figs. 1A and 1B.

The engine illustrated is a present day, four cycle, compression ignition type engine modified in certain respects to permit the practice of the invention.

The engine comprises a piston 10 and a cylinder 12 arranged to provide a compression ratio of the order of 14–17 to 1 in the combustion space defined thereby. The cylinder has a poppet valve 14 located in its air intake 16, and the valve is provided with a shroud 18. The shroud is so placed that it causes the incoming oxidizing gas, such as air, to swirl rapidly around the axis of the cylinder as it is drawn in on the intake stroke, and the swirl persists during the compression stroke. The swirl thus induced is "geared" to the engine crankshaft, in that the rate of swirl bears a substantially constant ratio to the r.p.m. of the engine regardless of changes in the engine speed. The rate at which the air swirls around the cylinder is determined by the shape and location of the shroud, which can be varied over a wide range by modifying the shape of the shroud and the air intake port. A swirl rate of approximately six times the engine speed in r.p.m. is particularly suitable, but rates from four to nine are satisfactory. A shroud of the type described in U.S. Patent No. 2,484,009, issued to E. M. Barber on Oct. 11, 1949, is satisfactory. As an alternative, the air may be introduced through tangential intake ports extending through the cylinder wall.

The engine is provided with a conventional exhaust poppet valve 20, and with a fuel injector nozzle 22 which projects through the wall of the cylinder and directs a spray of fuel which is easy to ignite by compression, i.e. a fuel having a cetane rating of 40–50, downstream and across the swirling air in the combustion space of the cylinder. Preferably the fuel is sprayed from the nozzle in a fan or cone shaped pattern. A fuel injection system 24 is connected to the nozzle 22 through a conduit 26, and provides the fuel during each cycle of operation of the engine. The timing of the fuel injection is controlled by a cam 28 which is geared to the crankshaft by conventional means (not shown). This cam makes one complete revolution for each two revolutions of the crankshaft.

The manner and rate of fuel injection are coordinated with the air swirl velocity and density to impregnate a localized segment of the air stream located at one side of the combustion space. The increments of the swirling air are impregnated at a controlled combustible fuel-air weight ratio within the range of about 0.04 to 0.08. The injection may start at a lower rate, such as to impregnate at a fuel-air weight ratio of about 0.04 to 0.06, and then be completed at a higher rate, such as to impregnate at a fuel-air weight ratio of about 0.06 to 0.08 during the latter part of the combustion phase.

In order to obtain maximum efficiency at maximum power, the fuel is injected during the major portion of the period required for the air to complete one swirl. However, the period during which fuel is injected should be slightly less than the period required for the air to complete one swirl, so as to avoid injecting fuel into the combustion gases, where it would be wasted and produce smoky exhaust. Moreover, the total fuel-air weight ratio on each cycle for full load operation should be about 0.06–0.065:1 to avoid smoky exhaust. The fuel injection should be initiated well in advance of top dead center, about 50° to 20° before.

The fuel injection system may be patterned after present day conventional "diesel" engine injection systems. However, the timing and the rate of fuel injection differ from that of such conventional "diesel" systems and should be arranged as discussed above.

Figs. 1A and 1B and 2 are based upon a swirl rate of six times the engine speed in r.p.m. (i.e. the air swirls once during each 60° of rotation of the crankshaft). The air swirls counter-clockwise as viewed in the plan views of Figs. 1A and 1B, the flow of air being represented by the line 30.

Fig. 2 shows one possible fuel timing arrangement for operation at full load. The fuel injection is initiated during the latter portion of the compression stroke, about 35° before the piston reaches top dead center, and the fuel injection is continued for about 80% to 90% of the period required for the air to complete one swirl, i.e. for about 50° of rotation of the crankshaft. During this injection period on each cycle at full load operation, the injection rate is maintained to provide for patch impregnation within the fuel-air weight ratio of 0.04 to 0.08, while in addition the total fuel-air weight ratio on each cycle does not exceed 0.065:1 but at least approximates 0.06:1.

For reduced load conditions, the amount of fuel may be reduced by maintaining the same rate of injection and reducing the duration of the injection period.

The first increment of the fuel injected during each cycle after forming a localized combustible fuel-air mixture is ignited by compression, which ignition occurs during the period of fuel injection and after a brief time interval from the beginning of injection, as illustrated in Fig. 1A.

Fig. 1B illustrates the stage of the combustion process when the piston is in its top dead center position, at which time the compression ignition has been completed, the flame front has been formed, and combustion of fuel-impregnated air is proceeding substantially as rapidly as combustible fuel-air mixture is formed therefrom. The combustion of fuel is localized within the area 32, and is confined in one direction by the air swirling toward the area and in the opposite direction by the products of combustion 34 traveling away from the area.

As a result of the improved combustion process during the latter part of each combustion period, the engine is more efficient than present day "diesel" or compression ignition engines, and higher power with freedom from exhaust smoke is obtained.

Since the first increment of fuel which is ignited by compression during each cycle of operation of the engine merely serves to provide a flame front, which thereafter ignites the remainder of the fuel which is injected during the cycle, the rate of injection of the first increment may be reduced to provide a lower fuel-air weight ratio than that provided during the remainder of the fuel injection period, thereby reducing the rate of pressure rise which follows the initiation of combustion.

Thus there has been shown and described an engine wherein the first increment of the fuel which is injected will be ignited by compression with a relatively short ignition lag and so with reduced intensity of compression ignition knock, to provide a flame front at the proper location with reference to the locus of fuel injection for prompt combustion of the remainder of the fuel which is injected during the cycle.

Obviously, many modifications and variations of the invention as hereinbefore set forth may be made without departing from the spirit and scope thereof, and therefore, only such limitations should be imposed as are indicated in the appended claims.

I claim:

1. In the operation of a reciprocating piston internal combustion engine wherein air is introduced into a combustion space of the engine in a manner to produce a high velocity air swirl therein of four to nine times engine r.p.m., fuel is injected about 50° to 20° before top dead center position of the piston in its compression stroke into a localized portion of the swirling air at one side of the combustion space in a manner and at a rate coordinated with the air swirl rate and density to produce patch impregnation at a controlled fuel-air weight ratio of 0.04 to 0.08, the first increment of injected fuel is ignited substantially as soon as it forms a localized patch of combustible mixture with the swirling air to establish a flame front, and fuel injection is continued on each cycle following ignition into succeeding increments of the compressed swirling air immediately in advance of the formed flame front so as to progressively form additional combustible mixture which is ignited by said flame front and burned substantially as rapidly as formed, so that the combustion of fuel during the latter part of the combustion period is restricted to and completed at the leading edge of the localized patch, said flame front being confined in one direction by the air swirling toward it and in the opposite direction by the products of combustion traveling away therefrom, the method of operating with flame front combustion on each cycle without positive ignition which comprises compressing the swirling air on each compression stroke of the piston, injecting at least during the initial part of each injection period of a cycle a fuel of sufficiently high cetane number for the compression ratio of the engine such that said localized impregnated patch formed from the first increment of injected fuel on each cycle undergoes prompt compression ignition after only a small angular swirl from the locus of injection and before sufficient fuel has been injected to produce an objectionable high intensity, compression ignition knock, said swirling air and continued injection of fuel causing the burning fuel particles to unite to establish said flame front generally along a radius of the combustion space substantially less than 90° of swirling movement from the locus of fuel injection so that the portion of the fuel injected on each cycle is into swirling air immediately in advance of the formed flame front with resulting flame front combustion as defined above, and terminating fuel injection on each cycle for full load operation about 80%–90% of the time required for the air to complete one swirl following the start of fuel injection, and regulating the injection rate for said full load operation so that the total fuel-air weight ratio on each cycle at least approximates 0.06:1 but does not exceed 0.065:1 to thereby avoid smoky exhaust.

2. The method according to claim 1, wherein the initial portion of fuel injection during the compression ignition portion of each cycle is at a lower rate producing patch impregnation at a fuel-air weight ratio of about 0.04 to 0.06, and the latter portion of the injection during the flame front combustion portion of each cycle is at a higher rate producing patch impregnation at a fuel-air weight ratio of about 0.06 to 0.08, thereby further minimizing the tendency to produce an objectionable high intensity knock on compression ignition.

3. The method according to claim 2 wherein said compression ratio is at least about 14:1 when utilized with a fuel having a cetane number of about 40.

References Cited in the file of this patent
UNITED STATES PATENTS 2,484,009    Barber ---------------- Oct. 11, 1949